United States Patent [19]

Ikedo

[11] 4,442,467

[45] Apr. 10, 1984

[54] DRIVE MECHANISM FOR CASSETTE TAPE RECORDING/REPRODUCING APPARATUS

[75] Inventor: Yuji Ikedo, Tokorozawa, Japan

[73] Assignee: Pioneer Electronic Corporation, Tokyo, Japan

[21] Appl. No.: 306,530

[22] Filed: Sep. 28, 1981

[30] Foreign Application Priority Data

Sep. 30, 1980 [JP] Japan ............................... 55-135268

[51] Int. Cl.³ ............................................... G11B 5/54

[52] U.S. Cl. ...................................... 360/105; 360/90; 360/96.2

[58] Field of Search ........................ 360/71, 74.1–74.2, 360/88, 90–96, 105, 96.1–96.6; 242/197–200, 204

[56] References Cited

U.S. PATENT DOCUMENTS 3,664,672 5/1972 Fujikawa et al. ............... 360/105 X
3,806,666 4/1974 Hashizume et al. ............... 360/96.2
4,214,283 7/1980 Fushimi et al. ................ 360/105 X
4,348,704 9/1982 Takagi et al. ................... 360/105 X
4,358,804 11/1982 Uehara ............................... 360/105

*Primary Examiner*—Aristotelis M. Psitos
*Assistant Examiner*—Kin Wong

[57] ABSTRACT

In a drive mechanism for a cassette tape recording/reproducing apparatus comprising a head base movable among the stop, pause and playback positions, a pair of capstans, and a pair of pinch rollers, a pair of assist gears adapted to be driven by the capstans and a pair of plungers are provided. When the first plunger is actuated to allow the first assist gear to rotate through its engagement with the forward capstan, selector means mounted on the head base is moved to the position engageable with the forward pinch roller and the head base is advanced to the pause position with the aid of the first assist gear. When the second plunger is further actuated, the head base is advanced to the playback position and the forward pinch roller is brought in contact with the forward pinch roller. The reverse operation can be done by actuating first the second plunger and then the first plunger.

10 Claims, 7 Drawing Figures

DRIVE MECHANISM FOR CASSETTE TAPE RECORDING/REPRODUCING APPARATUS

BACKGROUND OF THE INVENTION

This invention relates to a drive mechanism for a cassette tape recording/reproducing apparatus, and more particularly, a drive mechanism for reversing tape transport and moving a head base having a recording/reproducing head mounted thereon among the stop, pause and playback positions.

An object of the present invention is to provide a drive mechanism for a cassette tape recording/reproducing apparatus, which is of a simple structure and steadily performs a complicated operation.

SUMMARY OF THE INVENTION

In a drive mechanism for a cassette tape recording/reproducing apparatus comprising a head base movable among the stop, pause and playback positions, normally biased to the stop position and having a recording/reproducing head mounted thereon, a pair of forward and reverse capstans, and a pair of forward and reverse pinch rollers adapted to be moved in contact with the capstans, according to a first aspect of the present invention, a pair of assist gears adapted to be driven by the capstans are provided which assist in moving the head base. Actuating means for independently placing one of the assist gears in rotating engagement with the corresponding capstan, selector means mounted on the head base so as to be movable between the positions engageable with the forward and reverse pinch rollers under the control of the rotating assist gear, and means associated with the actuating means for advancing the head base are provided such that the actuating means places one assist gear in rotating engagement with the forward or reverse capstan to thereby rotate one assist gear. The head base is advanced with the aid of the rotating assist gear while the selector means is at the position engageable with the forward or reverse pinch roller.

The actuating means includes a pair of plungers which are associated with the assist gears. The head base advancing means includes means for operatively connecting one of the assist gears with the head base to advance the head base to the pause position, and means for operatively connecting both the plungers with the head base to advance the head base to the playback position.

The plungers are connected to the assist gears via suitable interlocking means such that when one plunger is actuated, the interlocking means allows one assist gear to engage and rotate with the corresponding capstan. The head base is advanced to the pause position with the aid of a rotational force of the rotating assist gear. At the same time, the selector means is moved by means of the rotating assist gear to the position engageable with the corresponding pinch roller. Following the actuation of one plunger, the other plunger is actuated to advance the head base to the playback position. The advancing head base urges the pinch roller in contact with the corresponding capstan by way of the selector means. A complicated operation can be carried out by means of this simple mechanism. Since the assist gears assist in advancing the head base, the plungers can be reduced in size or power.

In a further embodiment of the present invention, the assist gears have assist cams coaxially affixed thereto.

The selector means includes a pivoted swing lever adapted to be engaged by one of the assist cams and moved in one or the other direction thereby, and a slide plate slidably mounted on the head base and associated with the swing lever so as to move in one or the other direction therewith. A pause lever adapted to be engaged by the assist cams are provided for advancing the head base to the pause position. The swing lever and the pause lever are opposed with respect to the line connecting the axes of the assist gears. The two operations, movement of the pinch roller and advance of the head base can be conducted by rotating only one of the cams. By using cams of a simple configuration, operation can be achieved smoothly and the dimensions of the apparatus can be reduced.

In conventional automatic reverse type cassette tape recording/reproducing apparatus, a recording/reproducing head is located between a pair of erasing heads which are affixed on a head base together with the recording/reproducing head. When the head base with the recording/reproducing head is advanced to the pause or playback position during the fast forward, rewind or playback operation, the tape is transported in contact with both the erasing heads. This contact causes impediment in the tape transport, causing wow-and-flutter and abrasion of the tape and heads.

In a further preferred embodiment, a support having erasing heads at its longitudinal ends is pivoted on the head base and associated with the slide plate. When one assist gear is rotated, the swing lever is turned in one direction to move the slide plate to the position engageable with the forward or reverse pinch roller. The erasing head support is turned in one direction in accordance with the rotation of the swing lever by way of the slide plate, thereby advancing one of the erasing heads forward. When the head base is advanced to the playback position, the support is advanced together so that the selected erasing head is brought in contact with the tape.

In some tape recorders, the head base has a brake shoe mounted thereon. As the head base is moved from the playback position to the pause or stop position, the brake shoe is forced in contact with the reel bases. Since the brake shoe is fixed on the head base, both the reel bases are stopped at the same time or the take-up reel base is stopped prior to the supply reel base, often resulting in the slack of tape.

According to the present invention, a brake shoe is mounted on the head base and allowed for free motion over a limited range. The supply reel base is stopped prior to the take-up reel base so that the tape is stopped under tension exactly at an intended position.

BRIEF DESCRIPTION OF THE DRAWINGS

The above and other objects, features and advantages of the present invention will be more readily understood from the following description taken in conjuction with the accompanying drawings, in which.

DESCRIPTION OF THE PREFERRED EMBODIMENTS

Figure 1:
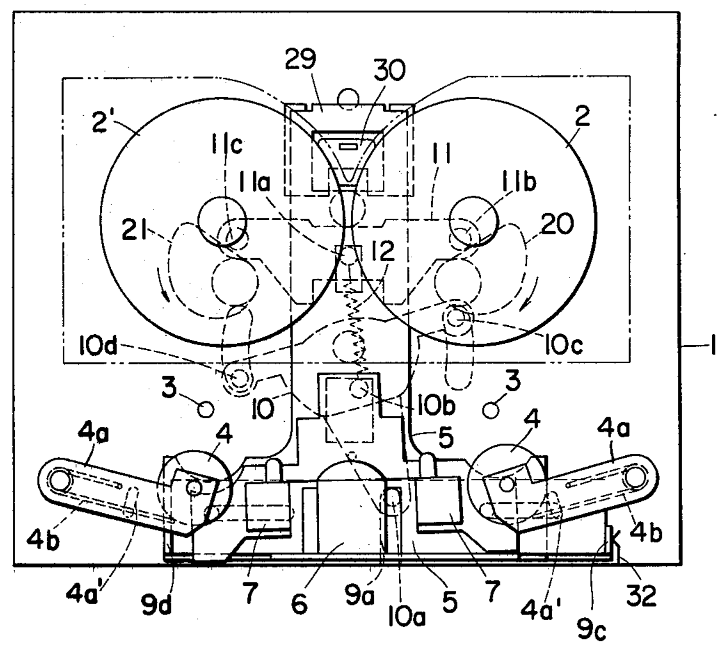
FIG. 1 is a plan view of one embodiment of the cassette tape recording/reproducing apparatus according to the invention.
Figure 3:
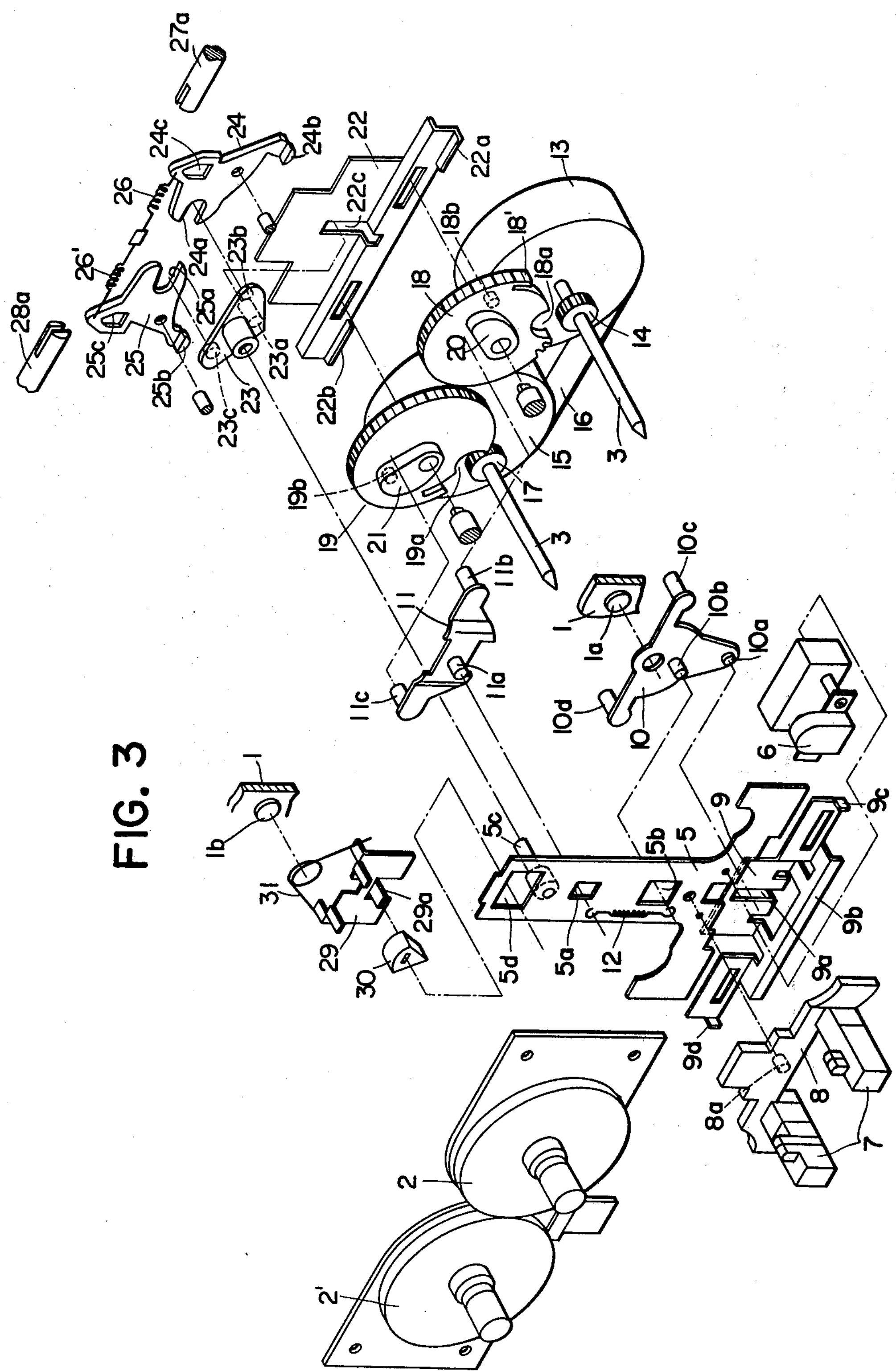
FIG. 3 is an exploded perspective view of the drive mechanism.

Referring to FIG. 1, an embodiment of the cassette tape recording/reproducing apparatus according to the present invention is illustrated as comprising a chassis 1 which is rectangular in the plan view. The cassette tape recorder stands in place in FIG. 1 and the term "vertical" used in the following description represents a direction perpendicular to the plane of the sheet of FIG. 1, and the term "lateral" represents the left-to-right direction. As usual in cassette tape recorders, this recorder comprises in the chassis 1, take-up and supply reel bases 2 and 2', capstan shafts 3, and pinch rollers 4. The pinch roller 4 is pivotally mounted on a pinch arm 4a of a U-shaped cross section which receives a torsion spring 4b with its one end being downward and loosely inserted into an opening 4a' in the lower side of the pinch arm 4a. The recorder further includes an inverted T-shaped head base 5, a recording/reproducing head 6 mounted thereon and erasing heads 7. As seen from FIG. 3, the erasing heads 7 are located at laterally opposite ends of a support plate 8 which is mounted for swing motion to the head base 5 by means of a pivot 8a projecting vertically downward from the center of the support plate 8. Positioned intermediate the head base 5 and the support plate 8 is a slide plate 9 which is allowed for lateral sliding motion. The slide plate 9 has a central upstanding portion 9b and upstanding tabs 9c and 9d at its laterally opposite ends. The central upstanding portion 9b is adapted to be in engagement with ramps 8b provided in the support 8 and the right and left tabs 9c and 9d are adapted to be in engagement with the springs 4b of the pinch arms 4a when the slide plate is moved to the right or left. It will be appreciated by those skilled in the art that if the recording/reproducing head 6 is a rotary head, the head is mounted on a pinion which meshes with a rack on the slide plate 9 such that the pinion is rotated with the sliding movement of the slide plate 9 (this example is not shown in the drawings). Below the head base 5, a T-shaped swing lever 10 is pivotally mounted on a fixed pivot 1a on the chassis 1. The swing lever 10 has at the tip of its center stem an upstanding pin 10a which passes through a slot 9a at the center of the slide plate 9 from below such that the slide plate 9 is laterally moved with the swing movement of the swing lever 10 about the pivot 1a. Also below the head base 5 is disposed a pause lever 11. The pause lever 11 has at its center a pin 11a embedded which passes through an opening 5a in the head base 5 from below. A tension spring 12 is extended between the pin 11a and a pin 10b which extends from the center stem of the swing lever 10 and passes through another opening 5b in the head base 5 from below.

A capstan motor designated at 13 has one capstan shaft 3 and a pinion gear 14 is affixed to the lower portion of the shaft 3. Paired with the capstan motor 13 is a sub-flywheel 15 which can be rotated by means of the capstan motor 13 via a belt 16. The other capstan shaft 3 is fixedly embedded in the sub-flywheel 15 at the center and another pinion gear 17 is affixed to the lower portion of the other shaft 3.

In association with the paired capstan motor and sub-flywheel or paired pinion gears, a pair of assist gears 18 and 19 are provided. The first assist gear 18 has teeth at its circumferential edge except for a cutout portion 18a so that it intermittently meshes with the pinion gear 14. The second assist gear 19 also has teeth at its circumferential edge except for a cutout portion 19a so that it intermittently meshes with the pinion gear 17. To the first and second assist gears 18 and 19 are attached first and second assist cams 20 and 21. Pins 11b and 11c are extended vertically downward from the laterally opposite ends of the pause lever 11 which are biased by the tension spring 12. The first and second assist cams 20 and 21 are in abutment with the pins 11b and 11c such that the assist cams 20 and 21 are biased to rotate in opposite directions shown by arrow in FIG. 1.

A trigger slider 22 is mounted for lateral sliding motion and has gear stops 22a and 22b at its laterally opposite ends. The assist gears 18 and 19 has pins 18b and 19b on the underside, respectively. The slider stops 22a, 22b and assist gear pins 18b, 19b are arranged such that the stops engage the pins to prevent rotation of the assist gears 18 and 19, respectively.

Numeral 23 is a differential lever which is mounted for rotation on a pivot 5c which is vertically downward extended from the underside of the head base 5. The differential lever is of a triangular configuration and has three pins 23a, 23b and 23c at its apexes. The central pin 23a is inserted into a central slot 22c in the trigger slider 22 from above. The differential lever 23 and the trigger slider 22 are associated such that the trigger slider 22 is laterally slided with the rotation of the differential lever 23 about the pivot 5c.

Figure 2:
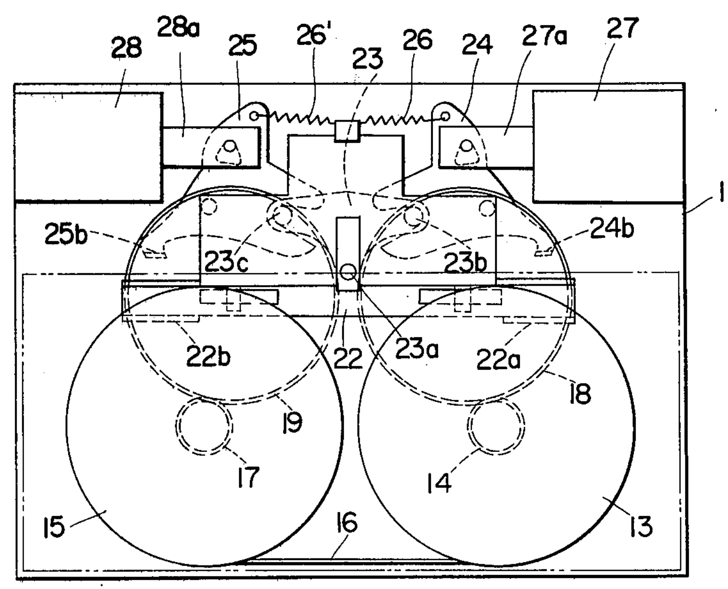
FIG. 2 is a plan view of the cassette tape apparatus taken at an intermediate plane, illustrating the drive mechanism thereof.

A pair of trigger levers 24 and 25 are mounted for rotation on the chassis 1 and have opposed recesses 24a and 25a, respectively. The trigger lever recesses 24a and 25a are in engagement with the pins 23b and 23c at the opposite ends of the differential lever 23. As shown in FIG. 2, if the first trigger lever 24 is turned clockwise, the differential lever 23 associated therewith is turned counterclockwise. If the second trigger lever 25 is turned counterclockwise, the differential lever 23 is turned clockwise. The trigger levers 24 and 25 also have gear stops 24b and 25b at their ends remote from the recesses 24a and 25a, respectively. When the trigger lever 24 or 25 is rotated, the stop 24b or 25b will advance into the path of rotation of the assist gear pins 18b and 19b. In addition, the trigger levers 24 and 25 are biased toward each other by means of linearly arranged tension springs 26 and 26'. The trigger levers 24 and 25 are connected to shafts 27a and 28a of plungers 27 and 28 by inserting connecting pins through the shafts and openings 24c and 25c in the trigger levers 24 and 25, respectively. With the plungers 27 or 28 actuated, the shaft 27a or 28a is retracted to turn the trigger lever 24 or 15 in an independent manner.

A brake support 29 has a central upstanding lip 29a to which a triangular brake shoe 30 is attached. The brake shoe 30 is inserted through an opening 5d at the end of the head base 5 from below such that the wedge-like side surface of the brake shoe 30 faces the valley between the reel bases. The brake support 29 is slidable, particularly the brake shoe attaching lip is movable within the opening 5d longitudinally of the center stem of the head base 5. The brake support 29 is resiliently biased toward the head 6 by a torsion spring 31 fitted on a fixed pin 1*b* on the chassis 1 such that the brake shoe 30 is resiliently urged against the circumferential surfaces of the take-up and supply reel bases 2 and 2' when the head base is moved back to the pause or stop position.

Numeral 32 designates a switch adapted to be contacted by the right end of the slide plate 9. The switch 32 is electrically connected in the circuitry of the tape recorder such that when the switch 32 is closed as a result of the rightward movement of the slide plate 9, the capstan motor 13 and the associated reel base 2 are reversed in the rotating direction, for example, rotated in the reverse direction.

The cassette tape recording/reproducing apparatus of the above-described arrangement will operate as follows.

In the inoperative or stop position of the apparatus, the plungers 27 and 28 are kept off. The trigger levers 24 and 25 connected to the plunger shafts 27*a* and 28*a* and biased by the tension springs 26 and 26' are maintained neutral as shown in FIG. 2. Accordingly, the differential lever 23 is in the neutral position, and the trigger slider 22 is also in the neutral position via the engagement of slot 22*c* with pin 23*a*. With the trigger slider 22 in the neutral position, the pins 18*b* and 19*b* on the underside of the first and second assist gears 18 and 19 are in engagement with the trigger slider stops 22*a* and 22*b*, respectively. Although the urging pins 11*b* and 11*c* of the pause lever 11 urges the first and second assist cams 20 and 21 in the directions shown by arrows in FIG. 1, the trigger slider stops 22*a* and 22*b* prevent the first and second assist gears 18 and 19 associated with the cams from rotating. It is designed such that when the assist gear 18 and 19 are prevented from rotating, the gear cutouts 18*a* and 19*a* face the pinion gears 14 and 17. The pinion gears 14 and 17 do not mesh with the assist gears 18 and 19, respectively. Accordingly, the assist gears 18 and 19 are not rotated even when the pinion gears 14 and 17 are rotated by means of the capstan motor 13.

As described above, when the first and second assist gears 18 and 19 are at rest, the pause lever 11 whose pins 11*b* and 11*c* are in engagement with the assist cams 20 and 21 and the head base 5 are also at rest. It will be understood that the swing lever 10, slide plate 9, erasing head support 8 and other members are at the positions resulting from the preceding operation, for example, in the reverse operation state as shown in FIG. 1.

Figure 4:
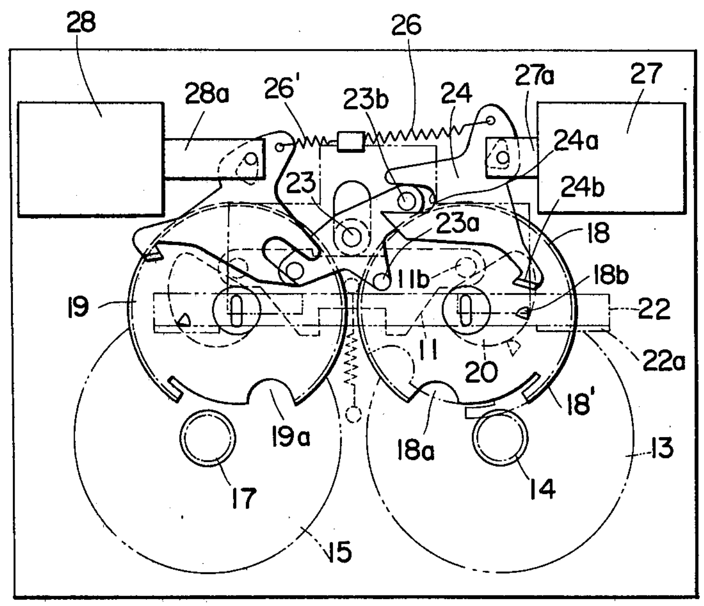
FIG. 4 is a plan view similar to FIG. 2, illustrating the drive mechanism at the pause position.

Provided that the first plunger 27 is first actuated in the above-described stop state, the plunger shaft 27*a* is retracted as shown in FIG. 4 to turn the first trigger lever 24 clockwise against the tension spring 26 as shown in FIG. 4. The differential lever 23 is turned counter-clockwise about the pivot 5*c* via the engagement of recess 24*a* with pin 23*b*. With the rotation of the first trigger lever 24, trigger slider 22 is moved to the right in FIG. 4 via the engagement of pin 23*a* with slot 22*c*.

When the trigger slider 22 is moved to the right, the trigger slider stop 22*a* is disengaged from the pin 18*b* on the first assist gear 18. As the pin 11*b* of the pause lever 11 provides the clockwise rotational force shown by the arrow in FIG. 1, the first assist cam 20, and hence, the first assist gear 18 are then rotated a small angle such that the leading edge 18' of the first assist gear 18 moves into mesh with the pinion gear 14. Since the pinion gear

14 is driven by the capstan motor 13, the first assist gear 18 is then forcedly rotated.

With the rotation of the pinion gear 14, the first assist cam 20 integral therewith is rotated. Upon rotation over an angle of about 180°, the first assist cam 20 engages and moves downward the pin 10*c* suspended from the swing lever 10, thereby rotating the swing lever 10 clockwise about the pivot 1*a*.

With the rotation of the swing lever 10, the slide plate 9 is moved leftward via the engagement of pin 10*a* with slot 9*a* to the position at which the right end tab 9*c* is engageable with the right pinch roller. The slide plate upstanding portion 9*b* moves along the ramp 8*b* of the upport 8 to slightly turn the support 8 clockwise about the pin 8*a*, thereby advancing the left erasing head 7 forward or toward the tape path.

Figure 5:
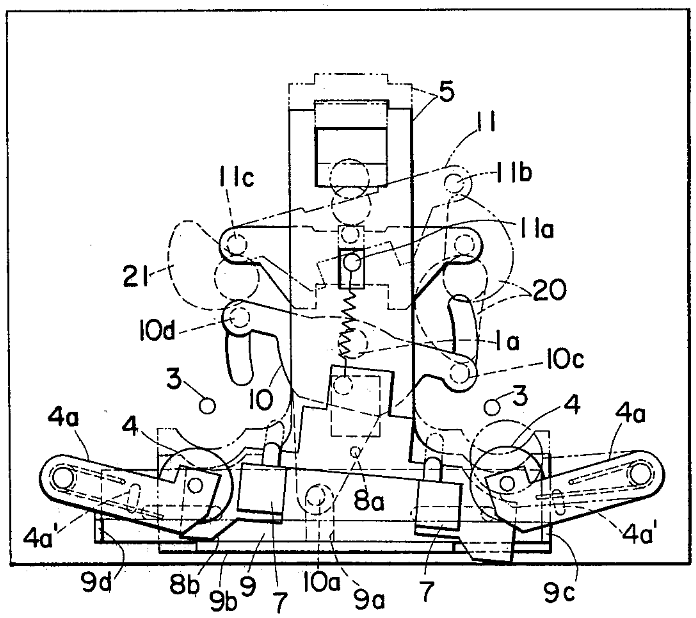
FIG. 5 is a plan view similar to FIG. 4, but at a different level, illustrating the movement of the head base to the pause position.

When the first assist gear cam 20 rotates a further 180°, the cam 20 moves the pause lever pin 11*b* upward as shown by dot-and-dash lines in FIG. 5. The pause lever 11 is thus turned counterclockwise about the pin 11*c* which is in engagement with the second assist cam 21. With the rotation of the pause lever 11, the central pin 11*a* is moved slightly upward, thereby moving the head base 5 to the pause position shown by dot-and-dash lines in FIG. 5. The first assist gear 18 assists in moving the head base to the pause position in this manner.

When the first assist cam 20 has rotated to the above-mentioned pause position, the first assist gear pin 18*b* is brought into engagement with the stop 24*b* of the first trigger lever 24. At the same time, the first assist gear 18 is disengaged from the pinion gear 14 as its cutout 18*a* comes in the position facing the pinion gear 14. The first assist gear 18 ceases to rotate. The pause state is thus maintained.

It is to be noted that even when the upward urging force to the pin 11*b* by the assist cam 20 is cancelled, the swing lever 10 is maintained in the clockwise turned position due to the deviation of the tension spring 12 to the left with respect to the center of the pivot 1*a* as apparent from FIG. 5, and the slide plate 9 and the erasing heads 7 are kept in the above-mentioned position.

Next, the second plunger 28 is actuated. The plunger shaft 28*a* is retracted to turn the second trigger lever 25 counterclockwise against the tension spring 26'. With the rotation of the second trigger lever 25, the differential lever 23 which has been turned counterclockwise by way of the first plunger 27 or the first trigger lever 24 is turned clockwise about the pin 23*b* in the first trigger lever slot 24*a* by way of the engagement of slot 25*a* with pin 23*c*. In accordance with this, the trigger slider 22 is moved leftward to the original neutral position by way of the engagement of pin 23*a* with slot 22*c*.

Figure 6:
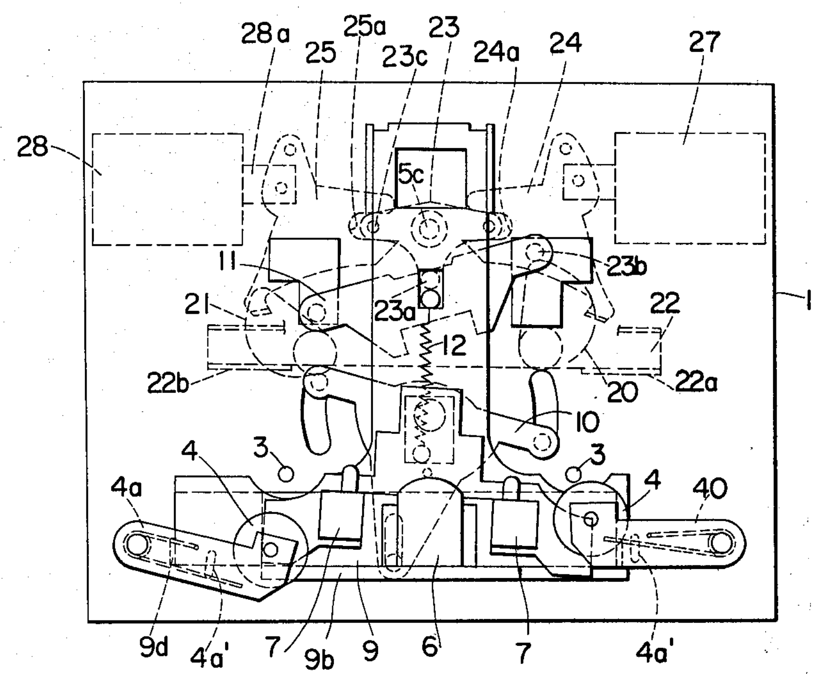
FIG. 6 is a plan view similar to FIG. 2, illustrating the drive mechanism at the playback position.
Figure 7:
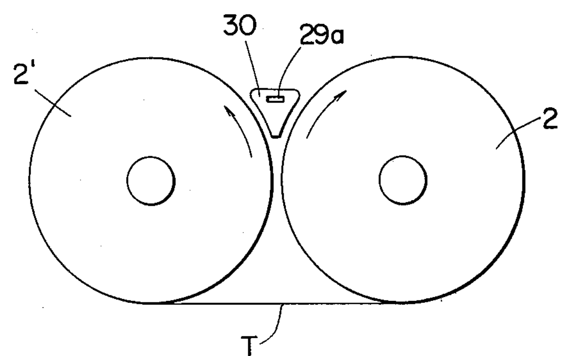
FIG. 7 is a schematic illustration of a brake mechanism.

As the differential lever 23 is turned clockwise about the pin 23*b*, the differential lever 23 itself, particularly its central postion is displaced upward. By way of the pivot 5*c*, the head base 5 is advanced to the playback position shown in FIG. 6.

As the head base 5 is advanced to the playback position, the slide plate 9 and the support 8 having the erasing heads 7 thereon are also advanced without changing its slanted relationship shown in FIG. 5. With the advance of the slide plate 9, the pinch roller advancing tab 9*c* at the right end of the slide plate 9 is brought into engagement with the portion of the torsion spring 4*b* which is loosely extended through the opening 4*a'* in the right pinch arm 4. The tab 9*c* urges forward the spring 4b to thereby turn the right pinch arm 4a so as to urge the pinch roller 4 against the capstan 3. At the same time, the other tab 9d on the left end of the slide plate 9 is also advanced forward. The path of movement of the other tab 9d is, however, off the portion of the torsion spring 4b which is extended through the opening 4a' in the arm 4a left pinch arm 4a. Thus the tab 9d does not engage the spring 4b and the left pinch roller 4 is kept in the original position.

With the advance of the head base 5 to the playback position, the brake shoe 30 at the forward end of the head base 5 is moved apart from the reel bases 2 and 2' so that both the reel bases 2 and 2' are released from the brake shoe at the same time.

As a result, the reel base 2 rotates to take up the tape constantly at a given rate determined by the right pinch roller 4 and the capstan 3. The tape is reproduced by means of the recording/reproducing head 6 or recorded thereby after erased by means of the erasing head 7 in contact with the tape.

To stop the apparatus, the first and second plungers 27 and 28 are turned off at same time. Then, the first trigger lever 24 and second trigger levers 24 and 25 are turned counterclockwise and clockwise, respectively, at the same time to resume their initial positions, that is, from the position shown in FIG. 6 to the position shown in FIG. 2. Since the differential lever 23 is in the neutral or playback state shown in FIG. 6 as described above, the differential lever 23 is moved in parallel without changing its lateral alignment. The head base 5 is accordingly returned to the initial stop position.

In response to the restoration of the first trigger lever 24, the first trigger lever stop 24b is disengaged from the pin 18b of the first assist gear 18. Then, the first assist cam 20 which is biased to rotate by means of the pause lever pin 11b and the associated first assist gear 18 are rotated a small angle until the first assist gear pin 18b engages the stop 22a of the trigger slider 22 which has restored its initial position. The first assist gear 24 stops rotating and resumes the initial stop position.

To transport the tape in the opposite direction, the above-mentioned arrangement may be operated in the reverse fashion becuase the arrangement is symmetric. First, the second plunger 28 is actuated. Then the differential lever 23 is turned clockwise throught the second trigger lever 25 to thereby slide the trigger slider 22 to the left. With the sliding of the trigger slider 22, the trigger slider stop 22b is disengaged from the pin 19b of the second assist gear 19, allowing the gear 19 to rotate counterclockwise to move in mesh with the pinion gear 17. When the second assist cam 21 has been rotated an angle of about 180°, the cam 21 urges downward the swing lever pin 10d to turn the swing lever 10 counterclockwise, thereby moving the slide plate 9 rightward to the position engageable with the left pinch roller. As a result, the support 8 is turned counterclockwise to advance the right erasing head 7 forward.

When the second assist cam 21 is then rotated a further 180° C., the cam 21 urges the pause lever pin 11c upward to turn the pause lever 11 clockwise about the pin 11b, thereby advancing the head base 5 to the pause position via the engagement of pin 11a with opening 5a.

Next, the first plunger 27 is actuated. Then the differential lever 23 is turned counterclockwise through the first trigger lever 24. Since the differential lever 23 is turned about the pin 23c, the head base 5 is advanced to the playback position via the pivot 5c. The slide plate 9 which has been moved to the right is advanced forward together with the head base 5 so that the left tab 9d engages the corresponding torsion spring 4b to turn the left pinch arm 4a, thereby bringing the left pinch roller 4 in contact with the capstan shaft 3. At the same time, the right erasing head 7 and the recording/reproducing head 6 are brought in contact with the tape.

With the rightward movement of the slide plate 9, the switch 32 is closed by means of the right end of the sliding plate 9 abutting therewith. Then the capstan motor 13 and the reel base 2 are rotated in the reverse direction so that the tape is transported in the reverse direction.

When the first and second plungers 27 and 28 are turned off at the same time, the head base 5 is restored to the stop position.

What is claimed is:

1. In a drive mechanism for a cassette tape recording-/reproducing apparatus comprising a head base movable among the stop, pause and playback positions, normally biased to the stop position and having a recording/reproducing head mounted thereon, a pair of forward and reverse capstans, and a pair of forward and reverse pinch rollers adapted to be moved in contact with the capstans, the improvement comprising a pair of assist gears adapted to be driven by the capstans, actuating means for independently placing one of the assist gears in rotating engagement with the corresponding capstan, selector means mounted on the head base so as to be movable between the positions engageable with the forward and reverse pinch rollers under the control of the rotating assist gear, and means associated with said actuating means for advancing the head base, whereby when one assist gear is rotated, the head base is advanced with said selector means being at the position engageable with the corresponding pinch roller.

2. The drive mechanism for a cassette tape recording-/reproducing apparatus as set forth in claim 1 wherein said actuating means includes a pair of plungers which are associated with said assist gears, whereby one plunger is actuated to allow the corresponding assist gear to rotate with the capstan.

3. The drive mechanism for a cassette tape recording-/reproducing apparatus as set forth in claim 2 wherein said head base advancing means includes means for operatively connecting one of the assist gears with the head base to advance the head base to the pause position, whereby one plunger is actuated to allow the corresponding assist gear to rotate with the capstan, thereby advancing the head base to the pause position with said selector means being at the position engageable with the corresponding pinch roller.

4. The drive mechanism for a cassette tape recording-/reproducing apparatus as set forth in claim 3 wherein said head base advancing means further includes means for operatively connecting both the plungers with the head base to advance the head base to the playback position, whereby after one plunger has been actuated, the other plunger is actuated to advance the head base to the playback position while the head base urges the pinch roller in contact with the corresponding capstan by way of said selector means.

5. In a drive mechanism for cassette tape recording-/reproducing apparatus comprising a head base movable among the stop, pause and playback positions, normally biased to the stop position and having a recording/reproducing head mounted thereon, a pair of pinch rollers, and a pair of capstans, the improvement comprising a pair of assist gears each adapted to be driven by the corresponding capstan, actuating means for placing one of the assist gears in rotating engagement with the corresponding capstan, said actuating means including a pair of plungers which are associated with said assist gears, selector means mounted on the head base so as to be movable between the positions engageable with the forward and reverse pinch rollers under the control of the rotating assist gear, means for operatively connecting the rotating assist gear with the head base to advance the head base to the pause position, and means for operatively connecting both the plungers with the head base to advance the head base to the playback position, whereby when one plunger is actuated, the corresponding assist gear is brought in rotating engagement with the corresponding capstan to rotate therewith, thereby advancing the head base to the pause position with said selector means being at the position engageable with the corresponding pinch roller, and when the other plunger is additionally actuated, the head base is further advanced to the playback position and urges the pinch roller in contact with the corresponding capstan by way of said selector means.

6. The drive mechanism for a cassette tape recording-/reproducing apparatus as set forth in claim 5 wherein said assist gears have assist cams coaxially affixed thereto, said selector means includes a pivoted swing lever adapted to be engaged by one of the assist cams and a slide plate slidably mounted on the head base and engaged with the swing lever, and said means for operatively connecting the rotating assist gear with the head-base includes a pause lever adapted to be engaged by one of the assist cams to advance the head base to the pause position.

7. The drive mechanism for a cassetta tape recording-/reproducing apparatus as set forth in claim 5 wherein said means for operatively connecting both the plungers with the head base includes a pair of pivoted trigger levers having one end connected to the plungers, a differential lever connected at its center to the head base, and having opposite ends pivotably connected to the other ends of said trigger levers, wherein when one plunger is actuated, said differential lever is turned about the pivotal connection of its other end to the other trigger lever, and when the other plunger is further actuated, said differential lever is turned about the pivotal connection of its one end to one trigger lever, whereby the head base is advanced to the playback position with the displacement of said differential lever.

8. The drive mechanism for a cassette tape recording-/reproducing apparatus as set forth in claim 5 wherein each of said assist gears is a partially cut-out gear.

9. The drive mechanism for a cassette tape recording-/reproducing apparatus as set forth in claim 5 wherein said selector means further includes a support pivotably mounted on the head base, engaged with the slide plate and having a pair of erasing heads at opposite ends, said support being pivoted by means of said swing lever through the slide plate to bring the corresponding erasing head in contact with the tape.

10. The drive mechanism for a cassette tape recording/reproducing apparatus as set forth in claim 1 wherein the apparatus further comprises a pair of supply and take-up reel bases, and the head base has a brake shoe mounted thereon, said brake shoe having wedge-like side surfaces facing the reel bases and being allowed for free motion over a limited range, whereby the wedge-like side surfaces of the brake shoe are brought in contact with the reel bases as the head base is moved from the playback position to the pause or stop position.

* * * * *